United States Patent [19]

Smith et al.

[11] 4,096,125
[45] Jun. 20, 1978

[54] POLYCAPROLACTONE DERIVATIVES AND COATING COMPOSITIONS THEREOF

[75] Inventors: Oliver Wendell Smith, South Charleston; Joseph Victor Koleske, Charleston, both of W. Va.

[73] Assignee: Union Carbide Corporation, New York, N.Y.

[21] Appl. No.: 690,353

[22] Filed: May 26, 1976

[51] Int. Cl.$^2$ ................. C08G 63/12; C08G 63/52; C08G 63/68
[52] U.S. Cl. ............. 260/75 R; 260/75 N; 260/75 UA; 260/78.41
[58] Field of Search ............. 260/75 R, 75 N, 78.41

[56] References Cited

U.S. PATENT DOCUMENTS

| | | | |
|---|---|---|---|
| 3,169,945 | 2/1965 | Hostettler et al. | 260/78.3 |
| 3,408,421 | 10/1968 | Kurka | 260/830 |
| 3,554,983 | 1/1971 | Goodman et al. | 260/78 |
| 3,668,178 | 6/1972 | Comstock et al. | 260/40 R |

*Primary Examiner*—Lucille M. Phynes
*Attorney, Agent, or Firm*—Francis M. Fazio

[57] ABSTRACT

Water insoluble adducts are produced comprising the reaction product of a polycaprolactone polyol and an anhydride of a polycarboxylic acid. The polycaprolactone polyol reacted with the anhydride of the polycarboxylic acid has an average of at least two hydroxyl groups in the molecule, a hydroxyl number of from about 15 to 600 and an average molecular weight of from about 290 to about 6,000. The carboxylic acid anhydride has at least one intramolecular carboxylic anhydride group. These water insoluble adducts on reaction with an inorganic or organic base produce water soluble, carboxyl modified oligomer addition reaction products which are eminently suitable for the production of aqueous coatings compositions. Exceptionally good coatings compositions are obtained when a crosslinker is present in the coating composition.

75 Claims, No Drawings

POLYCAPROLACTONE DERIVATIVES AND COATING COMPOSITIONS THEREOF

BACKGROUND OF THE INVENTION

Governmental regulations have placed ever increasing restrictions on the amounts and types of organic volatiles permitted to escape into the atmosphere from coatings compositions. Considerable efforts have been expended to develop coatings compositions having a minimal amount of volatile organic components and this has led to development of powder coatings, radiation curable coatings and water borne coatings. In these recent developments the amounts of organic solvents present are minimal and consequently there is little or no atmospheric pollution.

A particularly well known resin used in the coatings industry is the class of resins derived from epsilon-caprolactone. These polycaprolactone polyol derivatives produce coating materials of exceptional and desirable properties. However, as in all major instances in the past, they have generally been applied from organic solvent solutions. Any discovery which would eliminate the organic solvent would be of great importance in the coatings industry which depends upon these materials in many manufacturing or coating operations. Consequently, any discovery, such as the one which is hereinafter described, which would serve to lower atmospheric pollution and still produce a good satisfactory coating composition would be of great importance.

SUMMARY OF THE INVENTION

It has now been found that water soluble polycaprolactone derivatives can be prepared that can be used for the production of water borne coatings compositions. These water soluble polycaprolactone derivatives are obtained by reacting a polycaprolactone polyol and an anhydride of a polycarboxylic acid to produce a carboxyl modified adduct which is generally water insoluble. This adduct is converted to the water soluble form by reaction with an inorganic or organic base. The water soluble carboxyl modified oligomer addition reaction products resulting are then formulated into coatings compositions. The preferred coatings compositions are those that additionally contain a crosslinker. The aqueous coatings compositions are applied in conventional manner and thermally cured to dry film coatings.

DESCRIPTION OF THE INVENTION

The carboxyl modified adducts or derivatives that are eventually used to produce the coatings compositions are the adducts comprising the reaction product of a polycaprolactone polyol and an anhydride of a polycarboxylic acid which mixture of reaction products has subsequently been converted to a water soluble form by reaction with a base. As starting materials for producing the adducts one can use any of the known polycaprolactone polyols that are commercially available and that are fully described, for example, in U.S. Pat. No. 3,169,945. As described in this patent the polycaprolactone polyols are produced by the catalytic polymerization of an excess of a caprolactone and an organic polyfunctional initiator having at least two reactive hydrogen atoms. The polyols for use herein can be single compounds or mixtures of compounds and either can be used in this invention. The method for producing the polycaprolactone polyols is of no consequence and the organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols, and similar polyalkylene glycols, either blocked, capped or heteric, containing up to about 40 or more alkyleneoxy units in the molecule, 3-methyl-1,5-pentanediol, cyclohexanediol, 4,4'-methylene-bis-cyclohexanol, 4,4'-isopropylidene bis-cyclohexanol, xylenediol, 2-(4-hydroxymethylphenyl)ethanol, 1,4-butanediol, and the like; triols such as glycerol, trimethylolpropane, 1,2,6-hexanetriol, triethanolamine, triisopropanolamine, and the like, tetrols such as erythritol, pentaerythritol, N,N,N',N'-tetrakis(2-hydroxyethyl)ethylene diamine, and the like.

When the organic functional initiator is reacted with the caprolactone a reaction occurs that can be represented in its simplest form by the equation:

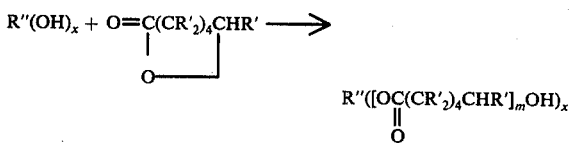

In this equation the organic functional initiator is the $R''=(OH)_x$ compound and the caprolactone is the

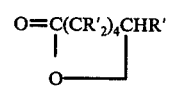

compound; this can be caprolactone itself or a substituted caprolactone wherein R' is an alkyl, alkoxy, aryl, cycloalkyl, alkaryl or aralkyl group having up to 12 carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 290 to about 6,000. The preferred polycaprolactone polyol compounds are those having an average molecular weight of from about 290 to about 3,000, preferably from about 300 to 1,000. The preferred are the polycaprolactone diol compounds having an average molecular weight of from about 290 to about 500 and the polycaprolactone triol compounds having an average molecular weight of from about 300 to about 1,000; these are preferred because of their low viscosity properties. In the formula m is an integer representing the average number of repeating units needed to produce the compound having said molecular weights. The hydroxyl number of the polycaprolactone polyol can be from about 15 to 600, preferably from 200 to 500; and the polycaprolactone polyol can have an average of from 2 to 6; preferably 2 to 4; hydroxyl groups.

Illustrative of polycaprolactone polyols that can be used as starting materials in this invention one can mention the reaction products of a polyhydroxyl compound having an average of from 2 to 6 hydroxyl groups with caprolactone. The manner in which these polycaprolactone polyol compositions are produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compound; this figure is shown in the third column.

| POLYCAPROLACTONE POLYOLS | | | |
|---|---|---|---|
| | Initiator | Average MW of polyol | Average No. of CPL units in molecules |
| 1 | Ethylene glycol | 290 | 2 |
| 2 | Ethylene glycol | 803 | 6.5 |
| 3 | Ethylene glycol | 2,114 | 18 |
| 4 | Propylene glycol | 874 | 7 |
| 5 | Octylene glycol | 602 | 4 |
| 6 | Decalence glycol | 801 | 5.5 |
| 7 | Diethylene glycol | 527 | 3.7 |
| 8 | Diethylene glycol | 847 | 6.5 |
| 9 | Diethylene glycol | 1,246 | 10 |
| 10 | Diethylene glycol | 1,998 | 16.6 |
| 11 | Diethylene glycol | 3,526 | 30 |
| 12 | Triethylene glycol | 754 | 5.3 |
| 13 | Polyethylene glycol (MW 200)* | 713 | 4.5 |
| 14 | Polyethylene glycol (MW 600)* | 1,398 | 7 |
| 15 | Polyethylene glycol (MW 1500)* | 2,868 | 12 |
| 16 | 1,2-Propylene glycol | 646 | 5 |
| 17 | 1,3-Propylene glycol | 988 | 8 |
| 18 | Dipropylene glycol | 476 | 3 |
| 19 | Polypropylene glycol (MW 425)* | 835 | 3.6 |
| 20 | Polypropylene glycol (MW 1000)* | 1,684 | 6 |
| 21 | Polypropylene glycol (MW 2000)* | 2,456 | 4 |
| 22 | Hexylene glycol | 916 | 7 |
| 23 | 2-Ethyl-1,3-hexanediol | 602 | 4 |
| 24 | 1,5-Pentanediol | 446 | 3 |
| 25 | 1,4-Cyclohexanediol | 629 | 4.5 |
| 26 | 1,6-Bis(hydroxyethyl)-benzene | 736 | 5 |
| 27 | Glycerol | 548 | 4. |
| 28 | 1,2,6-Hexanetriol | 476 | 3 |
| 29 | Trimethylolpropane | 590 | 4 |
| 30 | Trimethylolpropane | 750 | 5.4 |
| 31 | Trimethylolpropane | 1,103 | 8.5 |
| 32 | Triethanolamine | 890 | 6.5 |
| 33 | Erythritol | 920 | 7 |
| 34 | Pentaerythritol | 1,219 | 9.5 |

* = Average molecular weight of glycol

The structures of the compounds in the above, tabulation are obvious to one skilled in the art based on the information given. The structure of compound No. 7 is:

wherein the variable $r$ is an integer, the sum of $r + r$ has an average value of 3.7 and the average molecular weight is 527. The structure of compound No. 20 is:

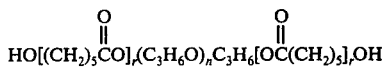

wherein the sum of $r + r$ has an average value of 6 and the average molecular weight is 1,684. This explanation makes explicit the structural formulas of compounds 1 to 34 set forth above.

The polycaprolactone polyol is reacted with a polycarboxylic acid anhydride and illustrative thereof one can mention trimellitic anhydride, tetrahydrophthalic anhydride, phthalic anhydride benzophenone dicarboxylic acid anhydride, succinic anhydride, maleic anhydride, naphthoic, anhydride, glutaric anhydride, or any other intramolecular anhydride, including those having substituents thereon such as halogen atoms, alkyl or alkoxy groups, nitro, carboxyl, aryl, or any other group which will not unduly interfere with the reaction.

The amount of polycarboxylic acid anhydride reacted with the polycaprolactone polyol can be an amount sufficient to permit reaction with all of the hydroxyl groups; however, it is preferred to use an amount which is insufficient to react with all of the hydroxyl groups present in the polycaprolactone polyol. This amount will vary and can be from 0.1 to 1 anhydride equivalent for each hydroxyl equivalent or group present in the polycaprolactone polyol initially charged to the reaction mixture and is preferably from 0.1 to 0.4. In a most preferred instance, one anhydride equivalent or anhydride moiety is charged for each nine hydroxyl equivalents or groups initially present in the reaction mixture.

The polycaprolactone polyols are reacted with the polycarboxylic acid anhydride at a temperature of from about 75° to 200° C., preferably from about 100° to 140° C. The time required for reaction will vary depending upon the particular reactants charged, the temperature and the batch size of the reaction mixture, facts which are well known to those skilled in the art. Generally it has been found that a reaction period in the laboratory of from 15 to 45 minutes at from about 125° to 150° C. is adequate to produce the initial water insoluble carboxyl modified oligomer addition reaction product obtained by the reaction of these two intermediates.

The water insoluble adduct formed at this stage of the reaction is a viscous liquid in most instances. However, in some instances it has been observed that the product will solidify upon standing at room temperature for an extended period of time. This, however, does not detract from its further utility. Generally these modified oligomer or adducts are water insoluble but solvent soluble.

The water insoluble adducts described above are converted to water soluble form by reaction with a base which can be either an inorganic or an organic base. The preferred bases are the organic amines. The bases that can be used are well known to those skilled in the art and any of the known bases can be used. Illustrative thereof one can mention ammonia, butylamine, morpholine, piperazine, triethylamine, N-methyl diethanolamine, N,N-diethyl ethanolamine, N,N-dimethyl propanolamine, triethanolamine, diethylamine, triisopropanolamine, monoethanolamine, diethanolamine, mono-isopropylamine, diisopropanolamine, 2-amino-2-methyl-1-propanolamine, and the like. While any amine can be used, the preferred are the tertiary amines.

The amount of amine or base added is an amount sufficient to neutralize essentially all of the free carboxylic groups in the water insoluble adduct and to take the pH of the reaction mixture to about 6 to 10, preferably from 7 to 9.

Reaction with the amine produces a product or adduct which is predominantly water soluble. This water soluble adduct is eminently suitable for the production of a water borne coating composition. While applicants have not fully established the structures of the adducts present in their reaction product mixture, it has been theorized that the reaction can proceed along the following route; however, the reaction product is a complex mixture of components.

Step 1

-continued

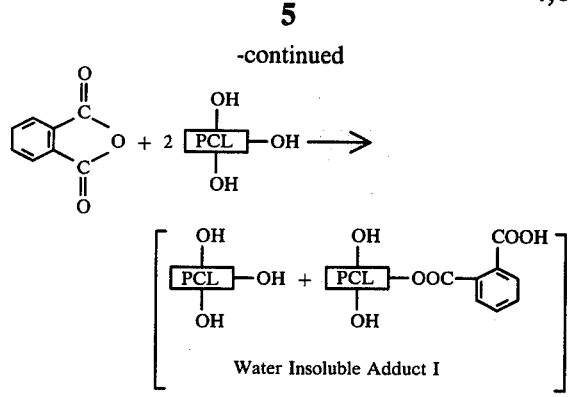

Water Insoluble Adduct I

Step 2

Water Insoluble Adduct I + CH₃N(CH₂CH₂OH)₂ ⟶

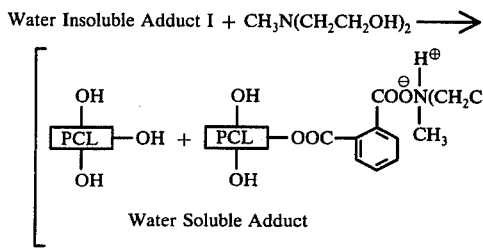

Water Soluble Adduct

In the above, the unit

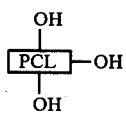

represents a polycaprolactone triol. In some instances, depending upon the amount of anhydride used in Step 1, the amount of water used to dissolve the adduct of Step 2 may be restricted before evidence of insolubilization is noted. While this theoretical explanation is presented, applicants do not intend to be bound by any theory.

In a typical reaction one normally charges a polycaprolactone polyol and the polycarboxylic acid anhydride to a reaction vessel and heats the mixture to a temperature of from about 125° to 175° C. for a period of about 20 to 30 minutes. This produces a water insoluble carboxyl modified oligomer or adduct. This water insoluble adduct is then neutralized with the base or amine at any convenient temperature and there is obtained a carboxyl modified oligomer or adduct as previously described that can be diluted with water to form coatings compositions.

In the schematics shown above specific ratios and compounds were employed for illustrative purposes only. It is apparent, in view of our complete description, that these can be modified within the ranges disclosed in this application.

The water soluble polycaprolactone derivatives or adducts prepared above can be used to produce coating compositions. They can also be modified in known manner by the addition of pigments, fillers and other additives conventionally added to coating compositions. In any instance they are applied to a surface by conventional means and then thermally cured either alone or in the presene of a crosslinker. It is preferred, however, to have a crosslinker present and in such instances the known catalyst for expediting the crosslinking reaction are generally added. The particular pigment or colorants added to the coating compositions are immaterial and any of the known conventional ones can be used. The amount of crosslinker present in the coating composition can vary from 25 to 200 weight percent, preferably 50 to 100 weight percent, based on the weight of the water soluble adduct present. Among the suitable crosslinkers are the urea formaldehyde aminoplasts, the hexamethoxymethyl melamines, and the known water dispersible transethers thereof with lower alkanols, benzoguanamine, acrylamide resins, as well as any of the other well known crosslinkers of the amine type.

Catalysts are generally present to catalyze a melamine or amine cure system and these are also well known. Among the common catalysts are the mineral acids such as hydrochloric acid or sulphuric acid, paratoluene sulphonic acid, dodecylbenzene sulphonic acid, phosphoric acid, maleic acid, trimelletic acid, phthalic acid, succinic acid, and the like. Also useful are the half esters of the anhydrides of said acids. It is known that the stronger the acidity, the better the catalytic activity.

The coating compositions are applied to a substrate by the known conventional methods. They are cured by heating at a temperature of about 125° to 250° C., preferably from 150° to 200° C. for a period of time sufficient to obtain a dry film. Generally, this time will range from about 1 to 30 minutes, preferably from 10 to 20 minutes. The components present in a particular coating composition used will determine the temperature and time that will be required to obtain an adequate cure and a good film coating.

The coatings compositions of this invention are generally high solids coatings compositions and they can contain as much as about 80 weight percent solids therein. Generally the total solids content of the coatings compositions of this invention range from about 40 to 70 weight percent of the total weight of the composition.

The coatings compositions were evaluated according to the following procedures. Crosshatch adhesion refers to a test using 10 parallel single edge razor blades to scribe test films with two sets of perpendicular lines on a crosshatch pattern. Ratings are based on the amount of film removed after applying and subsequently pulling a contact adhesive tape (Scotch Brand 606) away from the surface of the scribed coating at a 90° angle in a fast rapid movement. It is important to carefully apply and press the tape to the scribed coating to eliminate air bubbles and provide a good bond because adhesion is reported in percent of film remaining on the substrate with a 100 percent rating indicating complete adhesion of the film to the substrate.

Solvent resistance is a measure of the resistance of the cured film to attack by acetone and is reported in the number of rubs or cycles of acetone soaked cheesecloth required to remove one half of a film from the test area. The test is performed by stroking the film with an acetone soaked cheesecloth unitl that amount of film coating is removed. The number of cycles required to remove this amount of coating is a measure of the coating solvent resistance.

Reverse impact measures the ability of a given film to resist rupture from a falling weight. A Gardner Impact Tester using an eight pound dart is used to test the films cast and cured on the steel panel. The dart is raised to a given height in inches and dropped on to the reverse side of a coating metal panel. The inches times pounds, designated inch-pound, absorbed by the film without rupturing is recorded as the films reverse-impact resistance.

In this application the following definitions describe the particular compounds that are used in the examples:

Silicone Surfactant I is

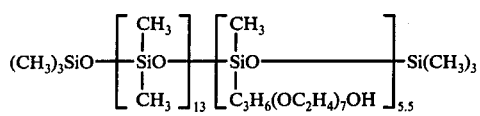

Polyol A is a polycaprolactone diol having an average molecular weight of 530 and an average hydroxyl number, measured in milligrams of potassium hydroxide per gram, of 212.

Polyol B is a polycaprolactone triol having an average molecular weight of 540 and an average hydroxyl number of 310.

Polyol C is a polycaprolactone tril having an average molecular weight of 300 and an average hydroxyl number of 560.

Polyol D is a polycaprolactone triol having an average molecular weight of 900 and an average hydroxyl number of 187.

Polyol E is a polycaprolactone octaol having an average molecular weight of 3,160 and an average hydroxyl number of 395.

The following examples further serve to define this invention.

EXAMPLE 1

A reaction flask equipped with a stirrer, thermometer and nitrogen inlet tube was charged with 270 grams of Polyol B and 105 grams of phthalic anhydride. The mixture was heated under nitrogen for 30 minutes at 140° C. and an amber colored, viscous liquid was produced as the adduct.

To 20 grams of the adduct reaction product produced above there were added 4.5 grams of N,N-dimethyl ethanolamine, 10 grams of hexamethoxymethylamine having about 1.5 weight percent methylol group content, 25 grams of water and 2 drops of Silicone Surfactant I. The resulting composition was a completely water-soluble coating composition. This was cast on a steel panel with a No. 40 wire wound rod and the film was cured for 10 minutes at 350° F. to produce a coating which had a reverse impact of 320 in.-lbs. and a pencil hardness of HB.

EXAMPLE 2

Following the procedure described in Example 1, 108 grams of hexahydrophthalic anhydride and 270 grams of Polyol B were heated for 30 minutes at 140° C. to produce a water insoluble, light amber, viscous reaction product as the adduct.

To 20 grams of the reaction product produced above there were added 4.5 grams of N,N-dimethyl ethanolamine, 10 grams of hexamethoxymethylmelamine having about 1.5 weight percent methylol group content, 25 grams of water and 2 drops of Silicone Surfactant I. The resulting composition was a completely water-soluble coating composition. This was cast on a steel panel with a No. 40 wire rod and the film was cured for 10 minutes at 350° F. to produce a coating. The cured coating was tacky and had a pencil hardness of 6B.

EXAMPLES 3 to 7

A series of compositions was produced by reacting 315 grams of Polyol B and 35 grams of phthalic anhydride under nitrogen for 30 minutes at 130° C. The adduct of the Polyol B and phthalic anhydride was water insoluble; it had a Brookfield RVT viscosity using a No. 4 spindle of 4,500 cps. at 24° C. and 650 cps. at 50° C. and the acid number was 40.6.

Separate 12.1 gram portions were reacted with 1.6 grams of N-methyl diethanolamine to produce a water-soluble composition. To each there were added 0.02 gram of Silicone Surfactant I and the amounts of hexamethoxymethylmelamine and water indicated in the table below. The hexamethoxymethylmelamine had about 1.5 water percent methylol group content. These water-soluble coating compositions were applied to steel panels, cured for 10 minutes at 350° F. and their properties determined. All of the films had a crosshatch dry adhesion test value of 100 percent and sustained 100 cycles of acetone rubs. The data indicates that reverse impact improved as the concentration or amount of crosslinker, hexamethoxymethylmalamine, increased.

| Example | 3 | 4 | 5 | 6 | 7 |
|---|---|---|---|---|---|
| Hexamethoxy-methylmelamine, g. | 4.0 | 5.9 | 7.9 | 9.9 | 11.9 |
| Water, g. | 11.8 | 13.1 | 14.4 | 15.7 | 17.1 |
| Reverse Impact, in.-lbs. | 100 | 150 | 150 | 200 | 275 |
| pencil hardness | B | HB | F | HB | B |

EXAMPLES 8 to 9

A series of experiments was carried out reacting Polyol B with maleic anhydride. The adduct produced was insoluble in water. Upon reaction of 20 grams of the adduct with 1.2 grams of dimethyl ethanolamine in 14 grams of water the product produced was a water-soluble coating composition that could be cured to a dry film after the addition of a crosslinker such as hexamethoxymethylmelamine. The materials charged and properties of the adduct are tabulated below. The initial reaction for producing the adduct was carried out at 130° C. for 30 minutes.

| Example | 8 | 9 |
|---|---|---|
| Polyol B, g. | 327 | 322 |
| Maleic anhydride, g. | 23 | 28 |
| RVT Brookfield viscosity cps. at 25° C., No. 4 spindle | 3,212 | 4,016 |
| Acid No. | 38 | 45 |

EXAMPLE 10

An adduct was produced by the procedure described in Example 1 by reacting 324 grams of Polyol B and 26 grams of phthalic anhydride. Water-soluble coating compositions were produced with various bases. These compositions, upon the addition of a crosslinker such as hexamethoxymethylmelamine and curing at elevated temperatures, yield satisfactory film coatings. In the table below is indicated the amount of amine required to solubilize 10 grams of the adduct described above in 5 grams of distilled water.

| Amine | Grams of Amine to Yield Water Solubility |
|---|---|
| Ammonium hydroxide (30% NH$_3$) | 0.6 |
| Butyl amine | 2.7 |
| Triethyl amine | 1.7 |
| Morpholine | 3.2 |
| Piperazine | 0.5 |
| Treithanolamine | 0.9 |
| N,N-Dimethyl ethanolamine | 0.5 |
| N-Methyl diethanolamine | 0.6 |

As indicated from the results, the tertiary amines, particularly the tertiary alkanol amines, and ammonium hydroxide, are more efficient than the primary or hetero amines.

EXAMPLE 11

In a manner similar to that described in Example 1, a mixture of 2,280 grams of Polyol C and 120 grams of maleic anhydride was reacted for 10 minutes at 130° C. There was obtained a water insoluble adduct having an acid number of 27.93 and a RVT Brookfield viscosity of 4,504 cps. at 25° C., No. 4 spindle. To this adduct there was added 3 grams of N,N-dimethyl ethanolamine and the RVT Brookfield viscosities in cps. at 25° C. were determined using a No. 3 spindle at 100 rpm at various weight percentage dilutions of the water-soluble compositions with water. For comparison, the viscosity of the undiluted, water-free adduct is also included. The results showed that increased dilution with water reduced the viscosity. In all instances the coating compositions cured to satisfactory films.

| Percent water added | Brookfield viscosity |
|---|---|
| 0 | 4,504 |
| 10 | 1,080 |
| 20 | 260 |
| 25 | 150 |
| 30 | 100 |
| 35 | 80 |
| 40 | 70 |

EXAMPLE 12

A mixture of 372 grams of Polyol B and 28 grams of maleic anhydride was reacted under nitrogen for 30 minutes at 100° C. to produce an adduct that was water insoluble, had an acid number of 40.5 and a RVT Brookfield viscosity of 3,464 cps. at 25° C., No. 2 spindle. A water-soluble coating composition was prepared containing 150 grams of this adduct, 150 grams of hexamethoxymethylmelamine, having about 1.5 weight percent methylol group content, 100 grams of water, 10 grams of N,N-dimethyl ethanolamine and 0.05 gram of Silicone Surfactant I. This coating composition had a pH of 8.5; it was cast on tin plate with a No. 40 wound rod and cured for 10 minutes at 350° F. The cured coatings were immersed in distilled water for 45 minutes at 77° C. to simulate the conditions under which canned beer is pasteurized. The coating on the panels showed no signs of water sensitivity or blush and had fair adhesion and flexibility.

EXAMPLES 13 to 17

A series of experiments was carried out to determine the effect of the addition of different reactive solvents to the adduct on cured film properties. In this series, 10 grams of the adduct produced in Example 11 were reacted with 0.8 gram of N,N-dimethyl ethanolamine. Ten grams of hexamethoxymethylmelamine, having about 1.5 weight percent methylol group content, and 6.7 grams of water were added to obtain a water-soluble coating composition. There was also added 2 grams of the reactive solvent identified in the table below. The water-soluble coating compositions were cast on steel panels using a No. 60 wire wound rod and cured for 20 minutes at 350° F. In each instance a dry coating was obtained. It was observed that the reverse impact of the cured film decreased as the functionality of the reactive solvent increased and the pencil hardness increased as the functionality increased.

| Example | 13 | 14 | 15 | 16 | 17 |
|---|---|---|---|---|---|
| Ethylene glycol, g. | — | 2 | — | — | — |
| Glycerine, g. | — | — | 2 | — | — |
| Trimethylol propane, g. | — | — | — | 2 | — |
| Pentaerythritol, g. | — | — | — | — | 2 |
| Reverse impact, in.-lbs. | 150 | 100 | 150 | 25 | <5 |
| Crosshatch adhesion, % | 100 | 100 | 100 | 100 | 100 |
| Acetone rubs | 100 | 100 | 100 | 100 | 100 |
| Pencil hardness | 2B | HB | 2H | 3H | 3H |

EXAMPLE 18

A pigmented coating composition was produced using a mixture of 100 grams of the adduct produced in Example 11, 100 grams of titanium dioxide, 0.5 gram of a lecithin type pigment dispersing aid (Nuosperse 657) and 25 grams of distilled water. The mixture was ground overnight on a ball mill, filtered and there was then added 10 grams of hexamethoxymethylmelamine, having a methylol group content of about 1.5 weight percent, 0.5 gram of N,N-dimethyl ethanolamine, 50 grams of water and 4 drops of Silicone Surfactant I to produce a white pigmented water-soluble, except for the pigment, coating composition. This coating composition was cast on a steel panel and cured for 20 minutes at 350° F. A uniform, hard film was obtained that had a reverse impact of 50 in.-lbs. crosshatch adhesion of 100 percent, pencil hardness of 2H and showed no deterioration after more than 100 acetone rubs.

EXAMPLE 19

In a manner similar to that described in Example 1, 360 grams of Polyol A and 40 grams of succinic anhydride were reacted for 30 minutes at 130° C. The adduct formed crystallized on standing overnight at room temperature. A water-soluble coating composition was produced containing 11.5 grams of the above adduct, 5.4 grams of water, 10 grams of hexamethoxymethylmelamine having a methylol group content of about 1.5 weight percent, 0.2 grams of N,N-dimethyl ethanolamine, 2 drops of Silicone Surfactant I and 0.2 gram of maleic acid as catalyst. A film cast on a steel panel and cured for 20 minutes at 350° F. had a pencil hardness of less than 6B and acetone resistance of 10 cycles.

EXAMPLE 20

In a manner similar to that described in Example 19, an adduct was produced by reacting 360 grams of Polyol D with 40 grams of succinic anhydride. The adduct was a highly viscous, water insoluble product. A water-soluble coating composition was produced in the same manner as was described in Example 19 and cured on steel panels. The cured coatings were soft, having a pencil hardness of 6B, and showed an acetone resistance of 12 cycles.

EXAMPLE 21 to 23

A series of water insoluble adducts was produced using Polyol C and succinic anhydride in the manner described in Example 19. Water-soluble coating compositions were produced by formulating 10 grams of each adduct with 10 grams of a mixture of tetra- and pentamethoxymethylmelamines, having a methylol group content of about 10 weight percent, 6.7 grams of water, 2 drops of Silicone Surfactant I and the amount of N,N-dimethyl ethanolamine indicated in the table. The quantity of N,N-dimethyl ethanolamine added was sufficient to produce a clear solution. These water-soluble compositions were coated on steel panels, cured for 20 minutes at 350° F., and evaluated. The data and results are set forth in the following table:

| Example | 21 | 22 | 23 |
|---|---|---|---|
| Polyol C, g. | 300 | 240 | 200 |
| Succinic anhydride, g. | 100 | 160 | 200 |
| Acid No. of adduct | 131 | 216 | 277 |
| Brookfield viscosity at 25° C. cps.* | 13,000 | 54,000 | 98,000 |
| N,N-dimethyl ethanolamine | | | |
| Pencil hardness | 3H | 3H | 2H |
| Reverse impact, in.-lbs. | <5 | <5 | 15 |

*RVT viscosity of adduct, using No. 6 spindle

All of the coatings had a crosshatch adhesion of 100 percent and had an acetone rub resistance of at least 100 cycles.

EXAMPLE 24

A mixture of 175 grams of Polyol B and 175 grams of Polyol C and 50 grams of phthalic anhydride was heated for 30 minutes at 130° C. under nitrogen to produce a water insoluble adduct that was neutralized with 31 grams of N,N-dimethyl ethanolamine to produce a water-soluble composition. A white coating composition was produced by formulation of 165 grams of the water-soluble composition with 135 grams of hexamethoxymethylmelamine, having a methylol group content of about 5 weight percent, 150 grams of titanium dioxide, 6 grams butoxyethanol, 50 grams of water and 10 drops of the adduct of 10.5 moles of ethylene oxide with nonylphenol. This composition was ground overnight in a ball mill, coated on steel panels, and cured at 350° F. for 20 minutes to afford a glossy, hard, adherent and impact resistant film.

EXAMPLE 25

Following a procedure similar to that described in Example 1, 175 grams of Polyol B, 175 grams of Polyol C, and 50 grams of phthalic anhydride were charged to the reactor and heated to 130° C. Heating was continued for 30 minutes at this temperature under nitrogen to produce a water insoluble viscous, liquid carboxyl modified oligomer adduct reaction product.

The ability to produce a water soluble coating composition with this water insoluble oligomer or adduct was evaluated by taking a 20 gram portion of the product and mixing it with an aqueous solution of a base containing approximately 0.018 mole of the base in the water. The different bases used and the amounts thereof were 0.7 gram of sodium hydroxide, 1.0 gram of potassium hydroxide, 1.4 gram of sodium bicarbonate, 0.5 gram of ethylene diamine, and 0.6 gram of diethylene triamine; these bases formed water soluble coating compositions. On the other hand, 1.8 grams of zinc oxide produced water insoluble compositions. The data shows that the weak or insoluble bases is required to obtain a water soluble composition.

EXAMPLE 26

In the procedure similar to that described in Example 25, 350 grams of Polyol A was reacted with 50 grams of phthalic anhydride to produce a water insoluble carboxyl modified adduct reaction product having an acid number of 48. This adduct was then reacted with 30.4 grams of dimethyl ethanolamine to produce a water soluble adduct reaction product mixture.

To 10 grams of the water soluble adduct produced above there was added 6 grams of hexamethoxymethylmelamine, containing about 5 weight percent methylol group, 5 grams of water and 0.04 gram of Silicone Surfactant I and the entire mixture stirred to homogeneity. This coating composition was cast on steel panels with the number 60 wire wound rod and the coating was cured at 350° F. for 20 minutes. A soft, flexible film with good solvent resistance and adhesion was obtained.

EXAMPLE 27

Following the procedure described in Example 25, 350 grams of Polyol E was reacted with 50 grams of phthalic anhydride to produce a water insoluble carboxyl modified adduct reaction product mixture having an acid number of 48. This was reacted with 30.6 grams of dimethyl ethanolamine to yield a water soluble product.

A 10 grams portion was formulated with 7.5 grams of hexamethoxymethylmelamine, having about 5 weight percent methylol group, 20 grams of water and 0.04 gram of Silicone Surfactant I to produce a water soluble coating composition. This was applied to steel panels with a number 40 wire wound rod and cured at 350° F. for 20 minutes. The dry films were hard, adherent and flexible.

EXAMPLE 28

Following the procedure described in Example 25, 150 grams of Polyol C, 150 grams of Polyol B and 41.4 grams of isatoic anhydride were reacted at 150° to 160° C. for 30 minutes. Then the temperature was lowered to 130° C. and 37.5 grams of phthalic anhydride were added and the mixture was heated for an additional 30 minutes at 130° C. The liquid product was cooled to 60° C. and reacted with 29.4 grams of dimethyl ethanolamine. Prior to reaction with the dimethyl ethanol the carboxyl modified adduct was insoluble in water, after reaction therewith it was water soluble.

A formulation was produced containing 10 grams of the above water soluble carboxyl modified product, 10 grams of hexamethoxymethylmelamine having a 1.5 weight percent methylol group content, 0.04 gram of Silicone Surfactant I and 3 grams of water. The formulation was a dark colored water soluble coating composition which when applied to steel panels with a number 60 wire wound rod and cured at 350° F. for 20 minutes produced dry, flexible, adherent and acetone resistant films.

EXAMPLE 29

Following the procedure described in Example 25, 175 grams of Polyol C, 175 grams of Polyol B, 20 grams of phthalic anhydride and 30 grams of succinic anhydride were reacted to produce a liquid water insoluble, carboxyl modified adduct reaction product mixture having an acid number of 59. This was then reacted with 37 grams of dimethyl ethanolamine to yield a water soluble reaction product or adduct.

A formulation was produced containing 10 grams of the above water soluble adduct, 10 grams of hexamethoxymethylmelamine having about 1.5 weight percent methylol groups, 0.04 gram of Silicone Surfactant I and 6.7 grams of water. This composition was a water soluble coating which when cast on steel panels with a number 60 wire wound rod and cured at 350° F. for 20 minutes produced dry films that had good hardness, adhesion, flexibility and solvent resistance.

EXAMPLE 30

Following the procedure described in Example 25, 1,080 grams of Polyol B, 1,080 grams of Polyol C and 240 grams of phthalic anhydride were reacted to produce a liquid adduct reaction product having an acid number of 39 and a RVT Brookfield viscosity of 8,700 cps. at 25° C. This adduct was water insoluble and was converted to a water soluble composition by reaction with 150 grams of dimethyl ethanolamine.

Formulations were prepared containing pigments or dyes by adding 0.5 grams of the pigment or dye to 5 grams of water and while stirring then adding 20 grams of the above water soluble adduct, 15 grams of hexamethoxymethylmelamine having a 1.5 weight percent methylol group content and 0.06 gram of Silicone Surfactant I. The dyes used were Eastman Fast Yellow 2RGLF, Capracyl Red (Acid Red 182), Sevron Blue 5G (Color Index No. 51004), and Celliton Fast Red. The colored coating compositions were applied to steel panels using a No. 60 wire wound rod and cured at 350° F. for 20 minutes. The cured coating containing the Eastman Fast Yellow was smooth and had a greenish-gold color; the coating containing the Caprocyl Red BB showed slight signs of dye incompatibility and was violet; the coating containing the Sevron Blue 5G was glossy and had a light brown color; and the coating containing the Celliton Fast Red B was relatively smooth and red. The data shows that aqueous dyed coating compositions can readily be produced with the water soluble reaction products of this invention.

EXAMPLE 31

Following the procedure described in Example 25, 175 grams of Polyol C, 175 grams of Polyol B, 35 grams of phthalic anhydride, and 15 grams of succinic anhydride were reacted to produce a liquid adduct reaction product that was water insoluble. This product had an acid number of 53.5.

The water insoluble reaction product produced above was reacted with 34 grams of dimethyl diethanolamine to produce a water soluble adduct reaction product. A 10 gram portion of this water soluble product was formulated with 10 grams of dimethylolurea and 6.7 grams of distilled water to yeild a clear water based coating composition. This was coated on cloth with a brush and cured in a 350° F. oven for 10 minutes to yield a flexible coated fabric that was somewhat stiffer than the original.

What we claim is:

1. A water insoluble adduct comprising the reaction product of a polycaprolactone polyol and an intramolecular anhydride of a polycarboxylic acid, wherein said polycaprolactone polyol has at least two hydroxyl groups in the molecule, a hydroxyl number of from 15 to 600 and an average molecular weight of from 290 to about 6,000, and wherein said anhydride has at least one intramolecular carboxylic anhydride group.

2. A water insoluble adduct as claimed in claim 1, wherein said polycaprolactone polyol has from 2 to 6 hydroxyl groups.

3. A water insoluble adduct as claimed in claim 1, wherein said polycaprolactone polyol has from 2 to 4 hydroxyl groups.

4. A water insoluble adduct as claimed in claim 1, wherein said polycaprolactone polyol has an average molecular weight of from 290 to 3,000.

5. A water insoluble adduct as claimed in claim 1, wherein said polycaprolactone polyol is a diol having an average molecular weight of from 290 to about 500.

6. A water insoluble adduct as claimed in claim 1, wherein said polycaprolactone polyol is a triol having an average molecular weight of from about 300 to about 1,000.

7. A water insoluble adduct as claimed in claim 1, wherein said polycaprolactone polyol is a mixture of polycaprolactone polyols.

8. A water insoluble adduct as claimed in claim 1, wherein said anhydride is phthalic anhydride.

9. A water insoluble adduct as claimed in claim 1, wherein said anhydride is hexahydrophthalic anhydride.

10. A water insoluble adduct as claimed in claim 1, wherein said anhydride is maleic anhydride.

11. A water insoluble adduct as claimed in claim 1, wherein said anhydride is trimellitic anhydride.

12. A water insoluble adduct as claimed in claim 1, wherein said anhydride is succinic anhydride.

13. A water insoluble adduct as claimed in claim 1, wherein said anhydride is isatoic anhydride.

14. A water insoluble adduct as claimed in claim 1, wherein from 0.1 to 1 anhydride equivalent per hydroxyl equivalent is initially charged and reacted.

15. A water insoluble adduct as claimed in claim 1, wherein from 0.1 to 0.4 anhydride equivalent per hydroxyl equivalent is initially charged and reacted.

16. A water insoluble adduct as claimed in claim 1, wherein said polycaprolactone polyol is a triol having an average molecular weight of about 540 and an average hydroxyl number of about 310 and said anhydride is phthalic anhydride.

17. A water insoluble adduct as claimed in claim 1, wherein said polycaprolactone polyol is a triol having an average molecular weight of about 540 and an average hydroxyl number of about 310 and said anhydride is hexahydrophthalic anhydride.

18. A water insoluble adduct as claimed in claim 1, wherein said polycaprolactone polyol is a triol having an average molecular weight of about 540 and an average hydroxyl number of about 310 and said anhydride is maleic anhydride.

19. A water insoluble adduct as claimed in claim 1, wherein said polycaprolactone polyol is a triol having an average molecular weight of about 300 and an average hydroxyl number of about 560 and said anhydride is maleic anhydride.

20. A water insoluble adduct as claimed in claim 1, wherein said polycaprolactone polyol is a diol having an average molecular weight of about 530 and an average hydroxyl number of about 212 and said anhydride is succinic anhydride.

21. A water insoluble adduct as claimed in claim 1, wherein said polycaprolactone polyol is a triol having an average molecular weight of about 900 and an average hydroxyl number of about 187 and said anhydride is succinic anhydride.

22. A water insoluble adduct as claimed in claim 1, wherein said polycaprolactone polyol is a triol having an average molecular weight of about 300 and an average hydroxyl number of about 560 and said anhydride is succinic anhydride.

23. A water insoluble adduct as claimed in claim 1, wherein said polycaprolactone polyol is a mixture of a triol having an average molecular weight of about 540 and an average hydroxyl number of about 310 with a triol having an average molecular weight of about 300 and an average hydroxyl number of about 560 and said anhydride is phthalic anhydride.

24. A water insoluble adduct as claimed in claim 1, wherein said polycaprolactone polyol is a mixture of a triol having an average molecular weight of about 540 and an average hydroxyl number of about 310 with a triol having an average molecular weight of about 300 and an average hydroxyl number of about 560 and said anhydride is succinic anhydride.

25. A water insoluble adduct as claimed in claim 1, wherein said polycaprolactone polyol is an octaol having an average molecular weight of 3,160 and an average hydroxyl number of 395 and said anhydride is phthalic anhydride.

26. A water soluble composition comprising the adduct reaction product of a polycaprolactone polyol and an intramolecular anhydride of a polycarboxylic acid, wherein said polycaprolactone polyol has at least two hydroxyl groups in the molecule, a hydroxyl number of from 15 to 600 and an average molecular weight of from 290 to about 6,000, and wherein said anhydride has at least one intramolecular carboxylic anhydride group and an inorganic or organic base in an amount sufficient to neutralize the free carboxyl groups of said adduct.

27. A water soluble composition as claimed in claim 26 wherein said polycaprolactone in said adduct has from 2 to 6 hydroxyl groups and said base is an organic amine.

28. A water soluble composition as claimed in claim 26 wherein said polycaprolactone in said adduct has from 2 to 4 hydroxyl groups and said base is an organic amine.

29. A water soluble composition as claimed in claim 26 wherein said polycaprolactone in said adduct has a molecular weight of from 290 to 3,000 and said base is an organic amine.

30. A water soluble composition as claimed in claim 26 wherein said polycaprolactone in said adduct is a diol having an average molecular weight of from about 290 to about 500 and said base is an organic amine.

31. A water soluble composition as claimed in claim 26 wherein said polycaprolactone in said adduct is a triol having an average molecular weight of from about 300 to about 1,000 and said base is an organic amine.

32. A water soluble composition as claimed in claim 26 wherein said polycaprolactone in said adduct is a mixture of polycaprolactone polyols and said base is an organic amine.

33. A water soluble composition as claimed in claim 26, wherein said anhydride in said adduct is phthalic anhydride and said base is an organic amine.

34. A water soluble composition as claimed in claim 26, wherein said anhydride in said adduct is hexahydrophthalic anhydride and said base is an organic amine.

35. A water soluble composition as claimed in claim 26, wherein said anhydride in said adduct is maleic anhydride and said base is an organic amine.

36. A water soluble composition as claimed in claim 26, wherein said anhydride in said adduct is trimellitic anhydride and said base is an organic amine.

37. A water soluble composition as claimed in claim 26, wherein said anhydride in said adduct is succinic anhydride and said base is an organic amine.

38. A water soluble compositions as claimed in claim 26, wherein said anhydride in said adduct is isatoic anhydride and said base is an organic amine.

39. A water soluble composition as claimed in claim 26, wherein in said adduct from 0.1 to 1 anhydride equivalent per hydroxyl equivalent is initially charged and reacted, and said base is an organic base.

40. A water soluble composition as claimed in claim 26, wherein in said adduct from 0.1 to 0.4 anhydride equivalent per hydroxyl equivalent is initially charged and reacted, and said base is an organic base.

41. A water soluble composition as claimed in claim 26, wherein said polycaprolactone in said adduct is a triol having an average hydroxyl number of 310, said anhydride is phthalic anhydride, and said base is N,N-dimethyl diethanolamine.

42. A water soluble composition as claimed in claim 26, wherein said polycaprolactone in said adduct is a triol having an average molecular weight of 540 and an average hydroxyl number of 310, said anhydride is hexahydrophthalic anhydride, and said base is N,N-dimethyl diethanolamine.

43. A water soluble composition as claimed in claim 26, wherein said polycaprolactone in said adduct is a triol having an average molecular weight of 540 and an average hydroxyl number of 310, said anhydride is maleic anhydride, and said base is N,N-dimethyl diethanolamine.

44. A water soluble composition as claimed in claim 26, wherein said polycaprolactone in said adduct is a triol having an average molecular weight of about 300 and an average hydroxyl number of about 560, said anhydride is maleic anhydride, and said base is N,N-dimethyl ethanolamine.

45. A water soluble composition as claimed in claim 26, wherein said polycaprolactone in said adduct is a diol having an average molecular weight of about 530 and an average hydroxyl number of about 212, said anhydride is succinic anhydride, and said base is N,N-dimethyl ethanolamine.

46. A water soluble composition as claimed in claim 26, wherein said polycaprolactone in said adduct is a triol having an average molecular weight of about 900 and an average hydroxyl number of about 187, said anhydride is succinic anhydride, and said base is N,N-dimethyl ethanolamine.

47. A water soluble composition as claimed in claim 26, wherein said polycaprolactone in said adduct is a triol having an average molecular weight of about 300 and an average hydroxyl number of about 560, said anhydride is succinic anhydride, and said base is N,N-dimethyl ethanolamine.

48. A water soluble composition as claimed in claim 26, wherein said polycaprolactone in said adduct is a mixture of a triol having an average molecular weight of about 540 and an average hydroxyl number of about 310 with a triol having an average molecular weight of about 300 and an average hydroxyl number of about 560, said anhydride is phthalic anhydride, and said base is N,N-dimethyl ethanolamine.

49. A water soluble composition as claimed in claim 26, wherein said polycaprolactone in said adduct is a mixture of a triol having an average molecular weight of about 540 and an average hydroxyl number of about 310 with a triol having an average molecular weight of about 300 and an average hydroxyl number of about 560, said anhydride is succinic anhydride and said base is N,N-dimethyl ethanolamine.

50. A water soluble composition as claimed in claim 26, wherein said polycaprolactone in said adduct is an octaol having an average molecular weight of about 3,160 and an average hydroxyl number of about 395, said anhydride is phthalic anhydride, and said base is N,N-dimethyl diethanolamine.

51. A coating composition comprising a water soluble composition as claimed in claim 26 and additionally containing from 25 to 200 weight percent of a crosslinking agent based on the weight of water soluble adduct present.

52. A coating composition comprising a water soluble composition as claimed in claim 27 and additionally containing from 25 to 200 weight percent of a crosslinking agent based on the weight of water soluble adduct present.

53. A coating composition comprising a water soluble composition as claimed in claim 28 and additionally containing from 25 to 200 weight percent of a crosslinking agent based on the weight of water soluble adduct present.

54. A coating composition comprising a water soluble composition as claimed in claim 29 and additionally containing from 25 to 200 weight percent of a crosslinking agent based on the weight of water soluble adduct present.

55. A coating composition comprising a water soluble composition as claimed in claim 30 and additionally containing from 25 to 200 weight percent of a crosslinking agent based on the weight of water soluble adduct present.

56. A coating composition comprising a water soluble composition as claimed in claim 31 and additionally containing from 25 to 200 weight percent of a crosslinking agent based on the weight of water soluble adduct present.

57. A coating composition comprising a water soluble composition as claimed in claim 32 and additionally containing from 25 to 200 weight percent of a crosslinking agent based on the weight of water soluble adduct present.

58. A coating composition comprising a water soluble composition as claimed in claim 33 and additionally containing from 25 to 200 weight percent of a crosslinking agent based on the weight of water soluble adduct present.

59. A coating composition comprising a water soluble composition as claimed in claim 34 and additionally containing from 25 to 200 weight percent of a crosslinking agent based on the weight of water soluble adduct present.

60. A coating composition comprising a water soluble composition as claimed in claim 35 and additionally containing from 25 to 200 weight percent of a crosslinking agent based on the weight of water soluble adduct present.

61. A coating composition comprising a water soluble composition as claimed in claim 36 and additionally containing from 25 to 200 weight percent of a crosslinking agent based on the weight of water soluble adduct present.

62. A coating composition comprising a water soluble composition as claimed in claim 37 and additionally containing from 25 to 200 weight percent of a crosslinking agent based on the weight of water soluble adduct present.

63. A coating composition comprising a water soluble composition as claimed in claim 38 and additionally containing from 25 to 200 weight percent of a crosslinking agent based on the weight of water soluble adduct present.

64. A coating composition comprising a water soluble composition as claimed in claim 39 and additionally containing from 25 to 200 weight percent of a crosslinking agent based on the weight of water soluble adduct present.

65. A coating composition comprising a water soluble composition as claimed in claim 40 and additionally containing from 25 to 200 weight percent of a crosslinking agent based on the weight of water soluble adduct present.

66. A coating composition comprising a water soluble composition as claimed in claim 41 and additionally containing from 25 to 200 weight percent of hexamethoxymethylmelamine based on the weight of water soluble adduct present.

67. A coating composition comprising a water soluble compositions as claimed in claim 42 and additionally containing from 25 to 200 weight percent of hexamethoxymethylmelamine based on the weight of water soluble adduct present.

68. A coating composition comprising a water soluble composition as claimed in claim 43 and additionally containing from 25 to 200 weight percent of hexamethoxymethylmelamine based on the weight of water soluble adduct present.

69. A coating composition comprising a water soluble composition as claimed in claim 44 and additionally containing from 25 to 200 weight percent of hexamethoxymethylmelamine based on the weight of water soluble adduct present.

70. A coating composition comprising a water soluble composition as claimed in claim 45 and additionally containing from 25 to 200 weight percent of hexamethoxymethylmelamine based on the weight of water soluble adduct present.

71. A coating composition comprising a water soluble composition as claimed in claim 46 and additionally containing from 25 to 200 weight percent of hexamethoxymethylmelamine based on the weight of water soluble adduct present.

72. A coating composition comprising a water soluble composition as claimed in claim 47 and additionally containing from 25 to 200 weight percent of hexamethoxymethylmelamine based on the weight of water soluble adduct present.

73. A coating composition comprising a water soluble composition as claimed in claim 48 and additionally containing from 25 to 200 weight percent of hexamethoxymethylmelamine based on the weight of water soluble adduct present.

74. A coating composition comprising a water soluble composition as claimed in claim 49 and additionally containing from 25 to 200 weight percent of hexamethoxymethylmelamine based on the weight of water soluble adduct present.

75. A coating composition comprising a water soluble composition as claimed in claim 50 and additionally containing from 25 to 200 weight percent of hexamethoxymethylmelamine based on the weight of water soluble adduct present.

* * * * *

UNITED STATES PATENT OFFICE
CERTIFICATE OF CORRECTION

Patent No. 4,096,125　　　　　　　　Dated June 20, 1978

Inventor(s) O. W. Smith et al

It is certified that error appears in the above-identified patent and that said Letters Patent are hereby corrected as shown below:

Column 12, lines 5 and 6 should read:

"---shows that the weak or insoluble bases failed to solubilize the oligomers and that a stronger base is required to obtain a water soluble composition.---"

Signed and Sealed this

Twenty-third Day of January 1979

[SEAL]

Attest:

RUTH C. MASON
*Attesting Officer*

DONALD W. BANNER
*Commissioner of Patents and Trademarks*